(12) United States Patent
Aker et al.

(10) Patent No.: US 7,998,343 B2
(45) Date of Patent: Aug. 16, 2011

(54) WASTEWATER TREATMENT SYSTEM

(75) Inventors: D. Mark Aker, Plymouth, IN (US); Dan A. Papczynski, Lakeville, IN (US); Caleb Youker, St. Joseph, MI (US)

(73) Assignee: Gast Manufacturing, Inc., Benton Harbor, MI (US)

( * ) Notice: Subject to any disclaimer, the term of this patent is extended or adjusted under 35 U.S.C. 154(b) by 609 days.

(21) Appl. No.: 12/099,494

(22) Filed: Apr. 8, 2008

(65) Prior Publication Data
US 2009/0250395 A1  Oct. 8, 2009

(51) Int. Cl.
*B01D 33/70* (2006.01)
(52) U.S. Cl. .................. 210/150; 210/151; 210/220
(58) Field of Classification Search .............. 210/220, 210/150–151
See application file for complete search history.

(56) References Cited

U.S. PATENT DOCUMENTS

| | | | | |
|---|---|---|---|---|
| 3,807,565 A * | 4/1974 | Langston et al. | ............. | 210/201 |
| 4,051,204 A * | 9/1977 | Muller et al. | ................ | 261/36.1 |
| 4,054,524 A * | 10/1977 | Mackrle et al. | ............ | 210/195.1 |
| 4,259,182 A * | 3/1981 | Belveal | ......................... | 210/629 |
| 5,162,083 A * | 11/1992 | Forbes et al. | ................ | 210/199 |
| 6,569,338 B1 * | 5/2003 | Ozyboyd | ...................... | 210/624 |

* cited by examiner

*Primary Examiner* — Chester Barry
(74) *Attorney, Agent, or Firm* — Miller, Matthias & Hull LLP

(57) ABSTRACT

Wastewater treatment systems are disclosed with improved aeration tanks. The aeration tank includes an inverted frusto-conical clarifier and a submersible aerator pump disposed between the bottom of the aeration tank and the interior of the clarifier. The pump is connected to an air inlet line that can pass downward through the clarifier. A plurality of bubble outlet lines extend outward from the pump radially and tangentially towards the sidewall of the aeration tank. Bubbles rise upward through the aeration space disposed outside of the clarifier and around the aeration space or around the clarifier for improved mixing. The system may include a baffled pretreatment tank and/or pump tank The slopes of the sidewalls of these tanks are of the same magnitude but opposite to that of the aeration tank thereby enabling tank nesting. Methods of retrofitting water treatment systems and treating wastewater are disclosed.

18 Claims, 10 Drawing Sheets

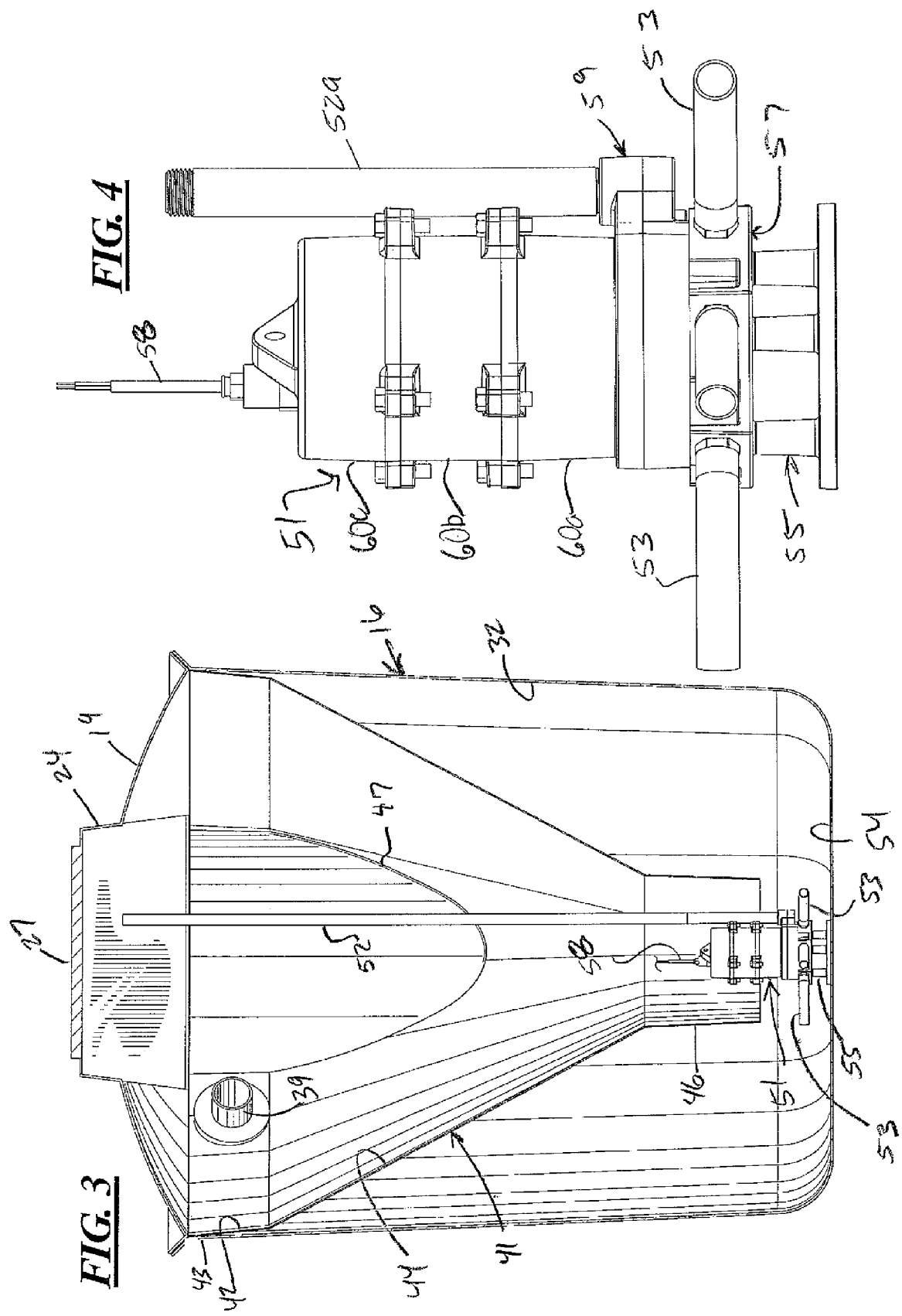

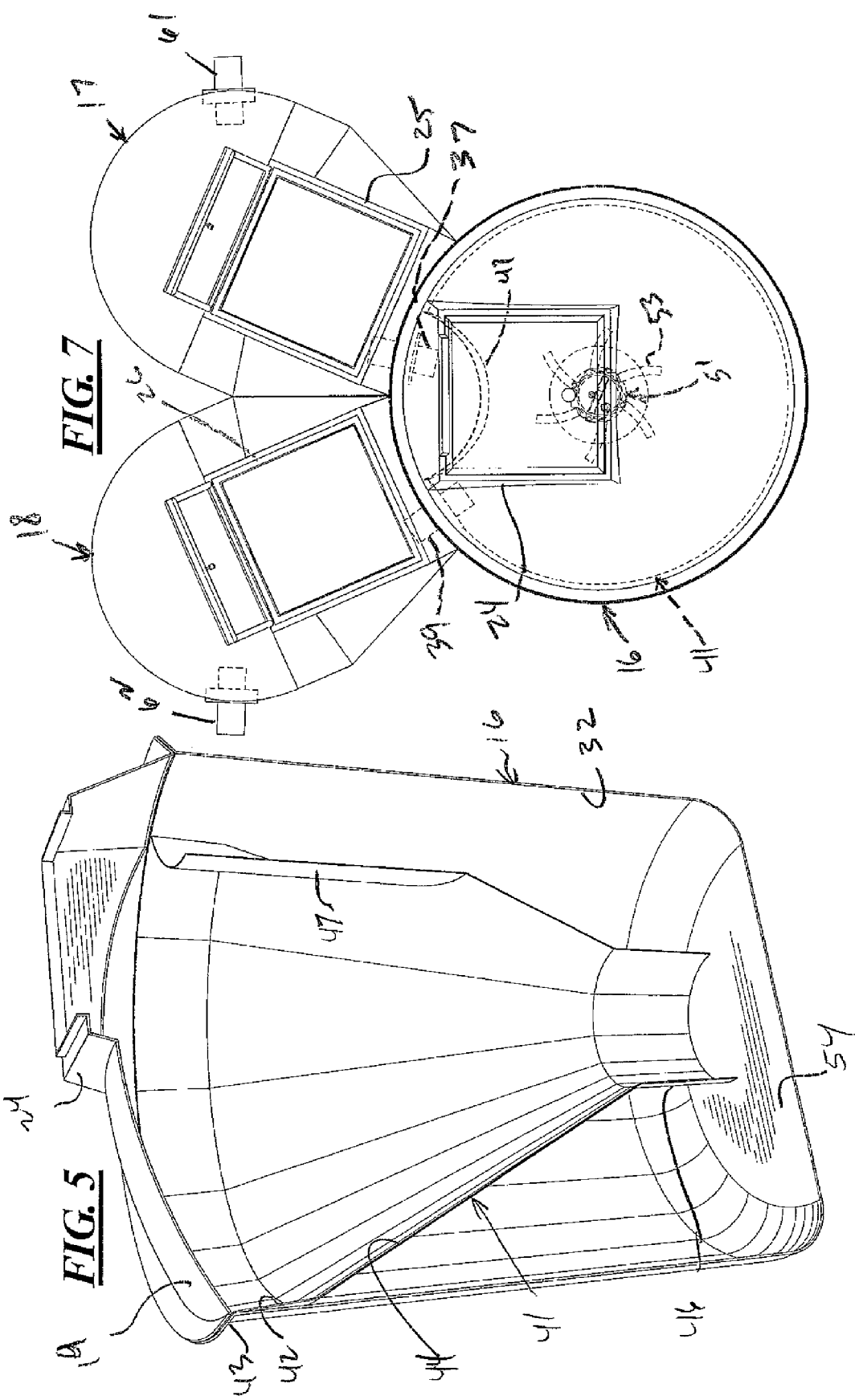

WASTEWATER TREATMENT SYSTEM

FIELD OF THE DISCLOSURE

This disclosure relates to improved wastewater treatment systems, to a retrofitting of the existing wastewater treatment systems for improved performance and compliance with more stringent regulatory requirements, and to improved methods of treating wastewater.

BACKGROUND OF THE DISCLOSURE

Residential wastewater treatment systems have become a popular alternative to septic tanks because they deliver cleaner water to the field. Some municipalities no longer permit traditional septic systems. Further, it is anticipated that municipal standards will continue to be more rigorous in the future. Because connecting a home to a city sewage system can be costly or simply unavailable, home wastewater treatment systems that are more effective than septic tanks will remain an attractive alternative and are expected to entirely replace the use of traditional septic tanks. Currently available home wastewater treatment systems are modeled after treatment processes employed by large central treatment plants, but are smaller and disposed underground.

Current home wastewater treatment processes mimic natural bacterial decomposition processes. Specifically, aerobic bacteria are utilized to digest and breakdown waste material in the water. The wastewater is aerated with an air compressor coupled to two or more diffusers spaced around the bottom of the treatment or aeration tank. Currently available diffusers include porous ceramic materials that are connected to the compressor by a flexible hose. The diffusers and compressor generate large quantities of small air bubbles which move upward through the wastewater. As the aerobic bacteria is naturally present in the wastewater, the bacteria multiply and flourish with the abundance of oxygen and food (waste material), resulting in the wastewater being converted to clear liquid and gas. Generally speaking, smaller bubbles provide better air-to-liquid contact and hasten the aerobic digestion process.

Currently available home wastewater systems can incorporate from one to three separate tanks. Referring to FIG. 11, aerobic bacterial purification takes place in an aeration tank 160. Raw sewage or wastewater may be received directly in the aeration tank 160 or in a separate pretreatment tank 170 where solid material is allowed to settle out or separate from the liquid. Liquid material may then be delivered from the pretreatment tank 170 to the aeration tank 160. Water from the aeration tank 160 may be delivered directly to the field or to a separate pump tank 180.

As shown in FIG. 11, the aeration tank 160 includes an aeration area 148 or space segregated by a clarifier cone 141 disposed within the aeration tank 160 which defines a clarifying area 149 or space. The clarifier cone 141 typically has an inverted frusto-conical shape. Either raw sewage from the home or liquid from the pretreatment tank 170 enters the aeration space 148 outside of the clarifier 141 where it is aerated and mixed with the aerobic bacteria. In addition to oxygenating the liquid in the aeration tank 160, the compressor 181 and diffusers 182 can also act to mix the material in the aeration space.

Hydraulic displacement causes the treated water to enter the clarifier 141. Due to the relatively calm conditions in the clarifier 141 and the upwardly sloping wall 144 of the clarifier 141, residual solid material drops downward through the open lower end or frustum 145 of the clarifier cone 141 and back to the aeration space 148 for further treatment. The remaining liquid material or effluent, upon reaching the outlet piping 139 disposed towards the wide upper end 142 of the clarifier 141, is clear and odorless. The material leaving the outlet 139 can be delivered to the holding or pump tank 180, delivered directly to a field through the line 191 for subsurface disposal or, in certain jurisdictions, may be discharged directly to a stream or pond or used for irrigation. A delivery pump is shown at 192.

Typically, a control panel is to used monitor the conditions within the tank(s). In current designs, both the control panel and compressor are disposed above ground for access and maintenance. Conventional wastewater treatment systems must be buried below ground a suitable distance away from the home or structure. The control panel and compressor are typically placed onto a wall of the home thereby requiring trenching for the electrical lines between the control panel and tank(s) as well as trenching for air lines between the compressor and the aeration tank. Alternatively, the compressor and a control panel can be located on the top of the aeration tank (see 181 in FIG. 11). In both designs, the compressor is disposed above ground, thereby generating unwanted noise or requiring relatively expensive compressors that ate selected for quiet operation.

Further, the use of currently available diffusers 182 is not without problems. Specifically, the porous ceramic diffusers need periodic maintenance or replacement, which requires the service personnel to pull the air lines connected to the diffusers upward out of the aeration tank. Gaining access to currently available home wastewater treatment tanks is also problematic as most systems include round lids or hatches with as many as a dozen bolts holding the lid or hatching place. Further, placement of the diffusers within the tank can be problematic as it may be difficult to adequately space the diffusers apart for thorough distribution of air bubbles and the diffusers are relatively inefficient in terms of mixing capabilities.

Another problem associated with current home wastewater treatment systems is associated with flooding. If the homeowner's yard or neighborhood floods, a multi-tank system can become buoyant and rise toward ground level. Thus, there is a need for a convenient means fox anchoring such as systems in place, particularly for areas which are prone to flooding.

Further, because a large hole is required to be excavated when home wastewater treatment systems are installed, the replacement and modification of such systems can be expensive. As wastewater treatment technology advances, there is a need for the ability to retrofit existing systems with improved technology thereby eliminating the need to replace systems altogether.

SUMMARY OF THE DISCLOSURE

In satisfaction of the aforenoted needs, a wastewater treatment system is disclosed which includes an improved aeration tank. The aeration tank comprises an open top, a closed bottom and a sidewall extending between the open top and closed bottom. The open top receives an inverted frusto-conical clarifier. The clarifier comprises a wide top received in the open top of the aeration tank, a narrow lower frustum disposed above the bottom of the aeration tank, and a tapered sidewall extending between the wide top and lower frustum. The tapered sidewall of the clarifier defines an interior of the clarifier inside the tapered sidewall and an aeration space between the tapered sidewall and the sidewall of the aeration tank. The improved aeration tank is equipped with a submersible aerator pump disposed between the bottom of the aeration tank and the interior of the clarifier. The aerator pump is connected to an air inlet line and a plurality of bubble outlet lines. The plurality of bubble outlet lines are disposed below the frustum and above the bottom of the aeration tank and are directed radially and tangentially outward towards the sidewall of the aeration tank. The bubble outlet lines create a swirl of small bubbles in the aeration space for thorough mixing and air/liquid contact.

In a refinement, the lower frustum of the clarifier cone is not the lower end of the cone but, instead, is connected to a downwardly extending cylinder that terminates above the bottom of the aeration tank. The aerator pump is at least partially disposed within the cylinder and the plurality of bubble outlet lines are disposed below the cylinder and are directed radially outward beyond the cylinder. In such a refinement, an upper end of the aerator pump may be anchored to the lower cylinder in a centralized position. Preferably, the air inlet line passes through the clarifier and lower frustum to the pump, with the aerator pump centered along an axis of the downwardly extending cylinder.

In another refinement, the open top of the aeration tank also receives a cover that is equipped with an aerator access hatch. The tapered sidewall of the clarifier may include an indented portion disposed below the aerator access hatch and in radial alignment with the inlet to the aeration tank. In this design, the aerator access hatch provides maintenance personnel with direct views of the aeration space and inlet through the indented portion and the interior of the clarifier. Preferably, the aerator access hatch is covered by a hinged lid.

In another refinement, the inlet to the aerator tank is in communication with a pretreatment tank and the outlet to the aerator tank is in communication with a pump tank. The pump and pretreatment tanks each comprise baffled sidewalls that extend upward at a first deviation from vertical. The baffles act to anchor the tanks underground and resist the effects of flooding. Further, the sidewall of the aerator tank extend upward from the bottom of the aerator tank at a second deviation from vertical that is opposite to and of a substantially similar magnitude as the first deviation. As a result, the non-vertical sidewalls of the aerator tank and pump tank nest together in an abutting engagement and the sidewalls of the aerator tank and pretreatment tank to nest together in an abutting engagement Because the aeration tanks are stackable, regional fabrication of the aeration tanks is not necessary and may not be required.

The pump and pretreatment tanks each include covers. Preferably, the covers of the pump and pretreatment tanks each include access hatches with hinged lids and simple, easy-to-use locks to facilitate access, service and maintenance.

In a refinement, the submersible aerator pump comprises an impeller housing supported above the bottom of the aeration tank. The impeller housing comprises a plurality of tangentially directed outlets, each of which are connected to one of the bubble outlets. The impeller housing further comprises a water inlet in communication with the aeration tank and an air inlet in communication with the air inlet line. The impeller housing further comprises a mixing chamber in communication with the water and air inlets. The mixing chamber houses an impeller. The impeller is mounted onto a rotor, with the rotor passing through a stator. The stator is disposed within a sealed housing. Preferably, the air inlet line and a power line extend from the aerator pump, through the clarifier and through the open top of the aeration tank. In another refinement, the aerator pump further comprises a foot bracket that supports the pump (and water inlet to the impeller housing) above the bottom of the aeration tank.

A method for retrofitting an existing aeration tank of a wastewater treatment system is also disclosed. The existing aeration tank is similar to the one described above except that it is not equipped with a submersible pump and, instead, uses one or mote diffusers connected to an above-ground compressor by flexible hoses. The method of retrofitting comprises: removing the compressor, diffuser and conduit; providing a submersible aerator pump that is connected to an elongated air inlet line and a plurality of tangentially arranged bubble outlet lines; placing the aerator pump downward through the clarifier and through the frustum of the clarifier and supporting the aerator pump and bubble outlet lines below the frustum so that the bubble outlet lines extend radially and tangentially outwards towards the sidewall of the aeration tank and away from the frustum of the clarifier.

In a refinement, the existing clarifying cone must be modified to accommodate the pump fitting through the lower frustum of the cone. In such a situation, the method further comprises the following steps before the aerator pump is placed in the tank: cutting the lower frustum off of the clarifier; and removing the lower frustum to create a new frustum disposed vertically above a plane passing through the now-removed lower frustum; providing an insert comprising an inverted frusto-conical upper section connected to a lower cylindrical section; inserting the insert down through the clarifier so that the upper section rests on the new frustum of the clarifier and the lower cylindrical section extends downward through the new frustum and towards the bottom of the aeration tank; and then the placing of the aerator pump comprises placing the aerator pump downward through the lower cylindrical section of the insert so that the bubble outlet lines extend radially outwards towards the sidewall of the aeration tank and away from the lower cylindrical section of the insert. In this method, the clarifying cone may or may not need to be removed from the aeration tank. The cutting of the lower end of the cone can be accomplished without removing the cone. However, depending upon the construction of the cone, it may be easier to simply remove the cone from the aeration tank before making the modification described above.

In a refinement, the retrofit method further comprises centering an upper portion of the aerator pump within the lower cylindrical section of the insert. In a further refinement of this concept, the retrofit method further comprises anchoring the upper portion of the aerator pump to the insert in a centralized position with respect to the lower cylindrical section of the insert and so that the bubble outlet lines extend tangentially and radially outward from the aerator pump below the lower cylindrical section of the insert and towards the sidewall of the aeration tank to create a swirl effect within the aeration space.

In another refinement, the retrofit method may further comprise replacing the original cover of the aeration tank with a replacement cover that comprises an access hatch equipped with a hinged lid.

In another refinement, the retrofit method may further comprise removing the clarifier from the aeration tank and replacing the clarifier with a replacement clarifier comprising a wide top connected to a downwardly extending conically-shaped sidewall that terminates at a narrow lower frustum which is connected to a downwardly extending lower cylinder. In such a refinement, the retrofit method comprises placing the aerator pump downward through the replacement clarifier and through the narrow lower frustum and lower cylinder of the clarifier and supporting the aerator pump and bubble outlet lines below the lower cylinder so that the bubble outlet lines extend radially and tangentially outwards towards the sidewall of the aeration tank and away from the lower cylinder of the replacement clarifier.

In another refinement, a specially designed and versatile control tower for wastewater treatment system is disclosed. The control tower houses a display and a processor, preferably disposed on a printed circuit board (PCB). The processor controls power to the aeration pump as well as a delivery pump if a separate pump tank is utilized. Further, the processor can monitor air intake to the aeration tank to ensure a sufficient airflow to the treatment tank. For example, if the airflow to the treatment tank is insufficient, the processor can provide an alarm. Therefore, a flow meter can be utilized in the air intake line to the aeration pump with the flow meter being linked to the processor. While float-type level indicators may be utilized in any or all of the tanks and linked to the processor, and air bell-type level indicator is preferred. Specifically, an inverted cup-shaped device is disposed near the bottom of the tank with a rigid air tube connecting the inverted cup or bell to a pressure transducer that is either linked to or an integral part of the processor. Thus, for a three tank system, the control tower has four primary inputs/outputs: two power lines for the aeration pump and delivery pump; an air tube or conduit connecting the air bell and pressure transducer to the processor; and communication from flow meter disposed in the air input line to the aeration pump. The control tower may be disposed near the system or up to 30 or 40 feet away. The display can provide the following information: airflow to aeration pump (CFM); pump tank or aeration tank level (or both); low airflow alarm fox aeration pump; high airflow alarm for aeration pump; low fluid level alarm; high fluid level alarm; fluid level in pump tank and/or aeration tank; service date or hours since less service; pump timer; cycle counter; dispense pump cycle setting (e.g. 30 gallons) and others. A single processor or PCB may be provided for single, double or triple tank systems and for systems of varying sizes, e.g., 750 gallons, 1250 gallons, 1500 gallons, etc.

A method for treating wastewater is also disclosed which comprises: receiving wastewater from a dwelling in an aeration tank as generally described above; drawing ail through one end of an air inlet line disposed above the open top of the aeration tank through the air inlet line and into a submersible aerator pump disposed between the bottom of the aeration tank and the interior of the clarifier, the air inlet line passing through the clarifier; mixing the air from the air inlet line with water taken from the aeration space within a mixing chamber of the aerator pump and ejecting bubbles resulting from the mixing tangentially outward from the aerator pump below the clarifier and towards the sidewall of the aeration tank so that the bubbles flow upward through and around the aeration space in a swirl pattern for both aeration and mixing purposes.

In a refinement, the method further comprises: supporting the aerator pump above the bottom of the aeration tank; drawing water into the mixing chamber through a water inlet disposed below the mixing chamber; drawing air into the mixing chamber through an air inlet disposed above the mixing chamber and through which a portion of a rotor passes that is connected to an impeller disposed within the mixing chamber; mixing the air and water in the mixing chamber with the impeller to create bubbles and ejecting the bubbles through outlet ports disposed tangentially with respect the impeller In another refinement, the method of treating wastewater further comprises: receiving the water in a pretreatment tank disposed upstream of the aeration tank; and delivering water from the interior of the clarifier of the aeration tank to a pump tank.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 3 is a front plan sectional view of the aeration tank shown in FIGS. 1 and 2;

FIG. 4 is a plan view of the aerator pump shown in FIGS. 2 and 3;

FIG. 5 is another sectional view of the aeration tank shown in FIGS. 1-3, particularly illustrating the indented portion of the clarifying cone which provides visual access to the aeration space or compartment within the aeration tank and the aeration tank inlet from the access hatch, which is also partially shown in FIG. 5;

FIG. 7 is a top plan view of the disclosed system as shown in FIGS. 1 and 6;

FIG. 10A is an exploded view of the aeration pump shown in FIGS. 2-4 and 10;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
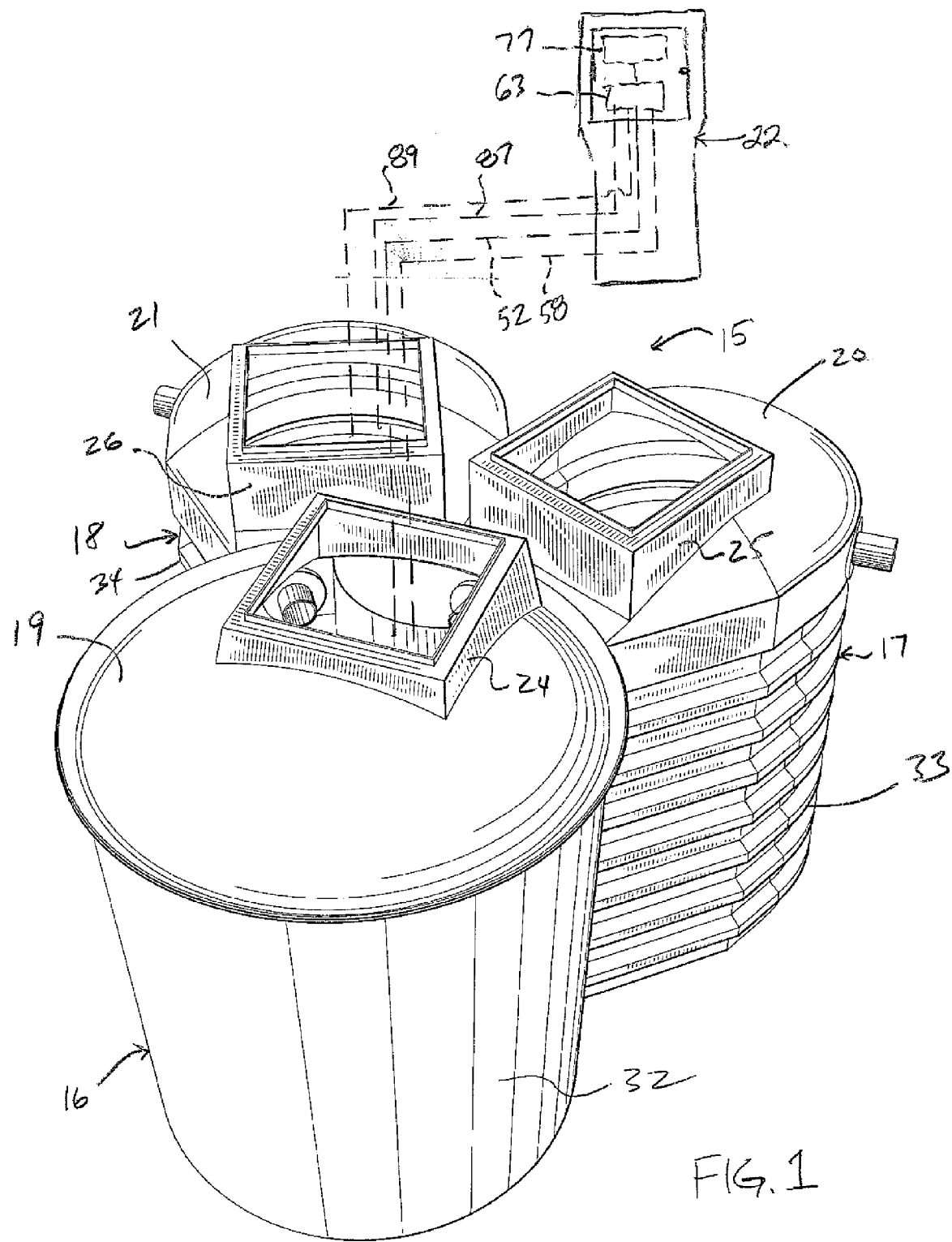
FIG. 1 is a perspective view of a wastewater treatment system made in accordance with this disclosure.

Turning to FIG. 1, a wastewater treatment system 15 is shown which includes an aeration tank 16, a pretreatment tank 17 and a pump tank 18. Alternative systems can be made in accordance with this disclosure with a single aeration tank 16. In other words, the pretreatment tank 17 end of the pump tank 18 are optional, but are preferred Each tank 16-18 includes a covet 19-21 which includes access hatches 24-26. A control tower 22 is linked to the aeration tank 16 and pump tank 18 as will be described in greater detail below in connection with FIGS. 2 and 12. The access hatches 24-26 are preferably equipped with hinged lids 27-29 (see FIG. 6) which can be secured with a single lock mechanism 31 as opposed to the multiple bolts and screws which are acquired by current designs In currently available systems, maintenance personnel must remove up to 12 bolts to gain access to a septic or wastewater treatment system. Often, the bolts get lost or the covers are difficult to realign properly when the maintenance tasks have been completed. The access hatches 24-26, hinged lids 27-29 and simplified locking system 31 therefore represent a substantial design improvement over currently available systems.

Returning to FIG. 1, while the sidewall 32 of the aeration tank 16 is generally cylindrical, the sidewall 32 deviates from vertical by an amount ranging from 1° to about 5°, preferably about 3°. The sidewalls 33, 34 of the pretreatment tank 17 and pump tank 18 are baffled. The baffled sidewalls 33, 34 help to anchor the tanks 17, 18 in place in the event flooding occurs. Further, the baffled sidewalls 33, 34 also deviate from vertical by a complementary or opposite amount than the sidewall 32 of the aeration tank. Specifically, in the example shown in FIG. 8, the sidewall 32 of the aeration tank 16 deviates from vertical by 3° and the baffled sidewall 33, 34 of the pretreatment or pump tanks 17, 18 deviate from vertical by −3° thereby enabling the sidewalls 33, 34 to nest or to closely abuttingly engage the sidewall 32 of the aeration tank 16.

Figure 2:
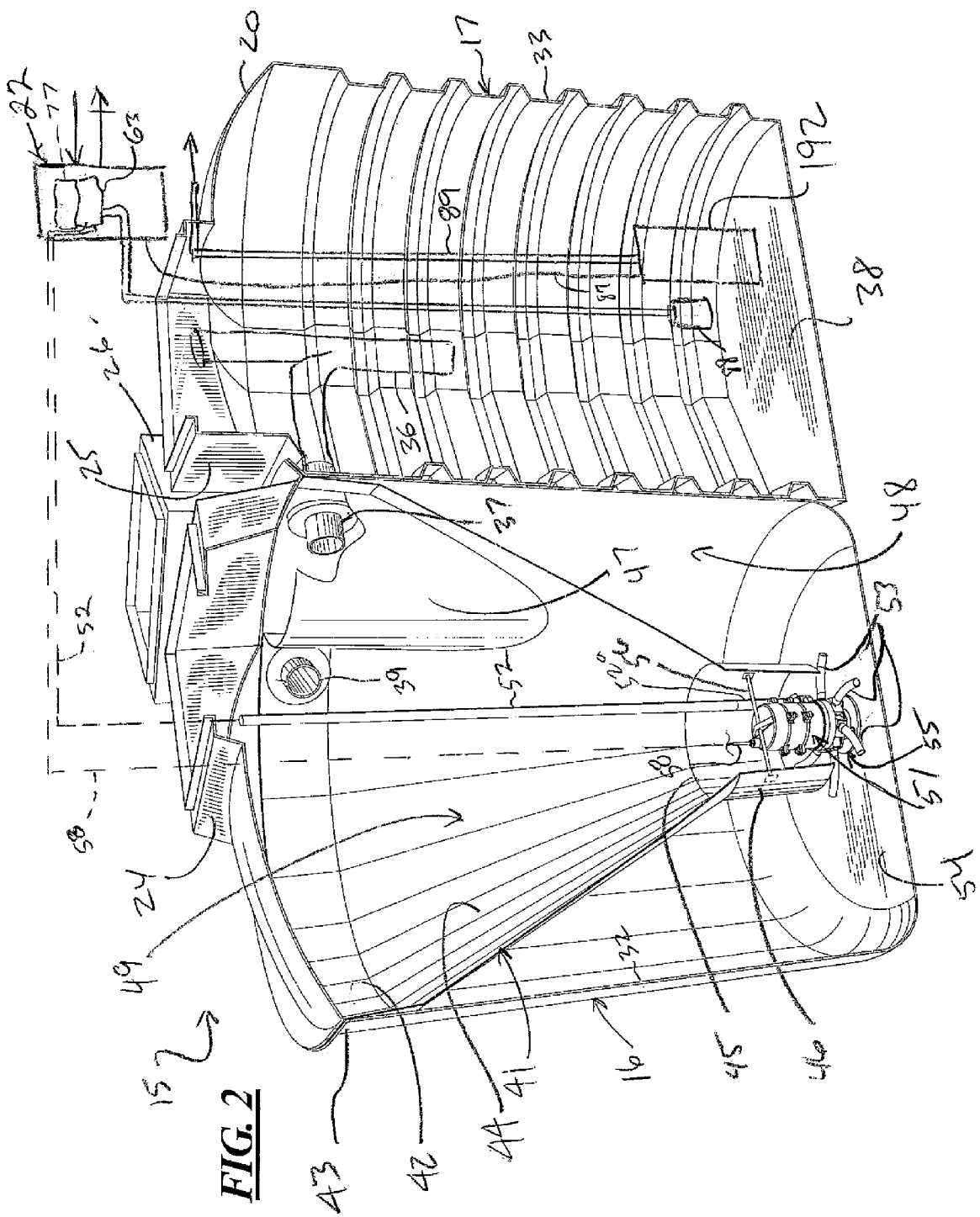
FIG. 2 is a sectional view of an aeration tank and pretreatment tank of the system shown in FIG. 1.

Turning to FIG. 2, the aeration tank 16 fits snugly against any baffled pretreatment tank 17. In many cases, the pretreatment tank 17 merely receives waste liquid or waste material from the household and serves as a place for solid material to settle out, similar to a prior art septic tank. An elbow fitting 36 is connected to the aerator tank inlet 37 so that liquid material may be drawn from the pretreatment tank 17 into the aerator tank 16 from somewhere in the middle of the pretreatment tank 17. Typically, heavier solid material settles to the bottom 38 of the pretreatment tank 17 and lighter solid material floats toward the top of the tank 17. Therefore, it is preferable to draw liquid towards the middle of the tank 17 using an elbow 36 or other similar fitting as shown in FIG. 2.

The aeration tank 16 as shown in FIG. 2 includes an outlet 39 that leads to the pump tank 18. The aeration tank 16 accommodates a clarifier cone shown at 41. The clarifier 41 has an inverted frusto-conical shape that includes an upper cylindrical section 42 secured to the top 43 of the aeration tank 16, a middle tapered wall 44 that extends downwardly before it is truncated at the frustum 45 and is connected to a downwardly extending cylindrical section 46. The clarifier 41 also includes an indented portion shown at 47. The indented portion 47 provides a visual access through the hatch 24 to the aeration tank inlet 37 and the "aeration space" or aeration compartment 48, which is generally considered to be the space between the clarifier 41 and the sidewall 32 of the aeration tank 16. Similarly, the area inside the clarifier 41 or the tapered wall 44 of the clarifier 41 is often referred to as the clarifying section, space or compartment 49.

Referring to FIGS. 2-4, the aeration tank 16 is equipped with an aeration pump 51 that will be described in greater detail below. The pump 51 is connected to an air inlet line 52 and a plurality of bubble outlet lines shown at 53. Air is drawn down the inlet 52 into the pump 51 where it is mixed with water to create fine bubbles which are then pumped out through the bubble outlet lines 53. It will be noted that the bubble outlet lines 53 extend both radially and tangentially away from the pump 51 thereby creating a swirl pattern of bubbles that begins near the bottom 54 of the aeration tank 16 and extends upward through the aeration space 48 outside the clarifier 41. In this aeration area 48, large quantities of bacteria flourish in the oxygenated water where they feed on waste material in the water. Prior art designs rely upon compressors disposed above ground and multiple diffusers placed around the bottom of the aeration tank. In contrast, the system 15 described here utilizes a submersible aeration pump 51, which is quiet and therefore preferred by homeowners, and makes use of multiple bubble outlet lines 53 that provides excellent dispersion of bubbles, improved mixing of materials in the aeration space 48 and therefore a superior environment for the bacteria to flourish, which is essential for the effective treatment of waste materials in the water.

Figure 12:
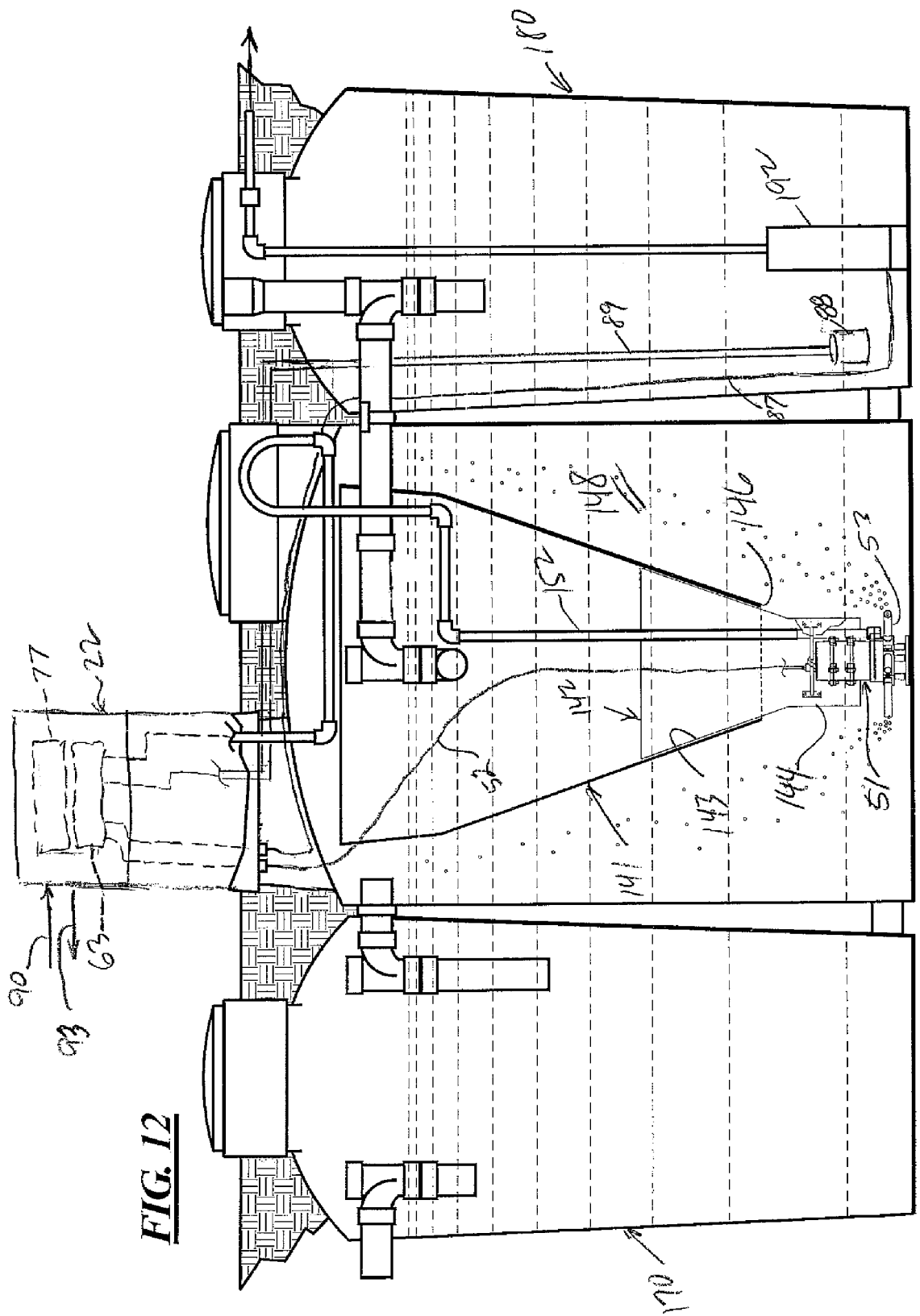
FIG. 12 is a plan view of the wastewater treatment system shown in FIG. 11, after retrofitting in accordance with the teachings of this disclosure.

As seen in FIGS. 1-2 and 12, the aeration pump 51 is linked to the control tower 22 by the power line 52 thereby enabling the processor or PCB 63 to control the operation of the aeration pump 51. Further, the air input line 52 (or 152 in FIG. 12) to the aeration pump 51 is also linked to the control tower 22 and specifically the processor 63. A processor 63 includes a flow meter or a flow meter is disposed in the input line 52 (or 152 in FIG. 12) to provide data as to the air flow rate to the aeration pump 51. If the air flow rate is insufficient, the processor 63 may provide an alarm that is audible or visible on the display 77. FIGS. 2 and 12 also illustrate the dispense pump 192 that is connected to the tower 22 by the power line 87. The processor 63 may be programmed to operate the dispensed pump 192 at fixed intervals or fixed quantities, such as 30 gallon dispenses Activation of the pump 192 by the processor 63 may be initiated by data from the level indicator 88 which is in air bell or inverted cup filled with air and connected to conduit 89. The conduit 89 maybe rigid for purposes of holding the bell 88 in place or the bell 88 may be held in place by another means, such as a bracket or fixture. The conduit 89 is in communication with a pressure transducer (not shown) that is either separate or integral with the PCB 63. The tower 22 also includes an air intake 90 and an exhaust 93. The tower 22 may be disposed on top of or close to a system as indicated in FIGS. 2 and 12 or the tower 22 may be disposed remotely from the system as indicated schematically in FIG. 1.

As shown in FIG. 3, the pump 51 is disposed in a centralized position within the lower cylinder 46 of the clarifier 41. Further, the pump 51 is supported above the bottom 54 of the aeration tank 16 by a foot bracket shown at 55. As shown in FIG. 2, a centralizer bar 56 is used to centralize the pump 51 in position and anchor it in place. As shown in FIGS. 2-3, the pump 51 extends partially into the cylinder 46 with the impeller casing 57 (FIG. 4) disposed below the cylinder 46 and above the bottom 54 of the aeration tank 16. Preferably, the air inlet line 52 as well as the power line 58 runs directly down through the clarifier 41.

Figure 9:
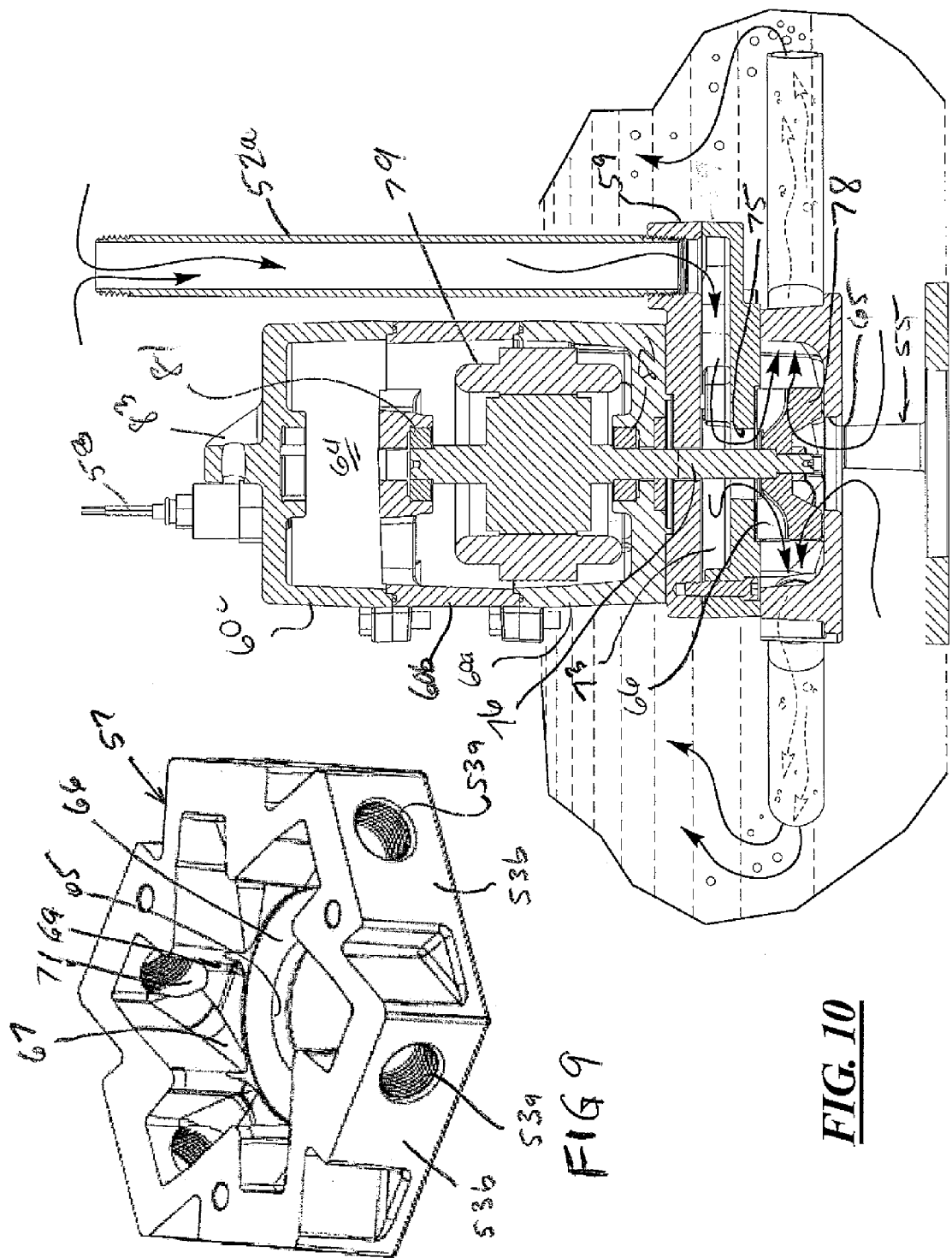
FIG. 9 is a perspective view of the impeller housing of the aeration pump shown in FIGS. 2-4 and 10-10A.
Figure 10:
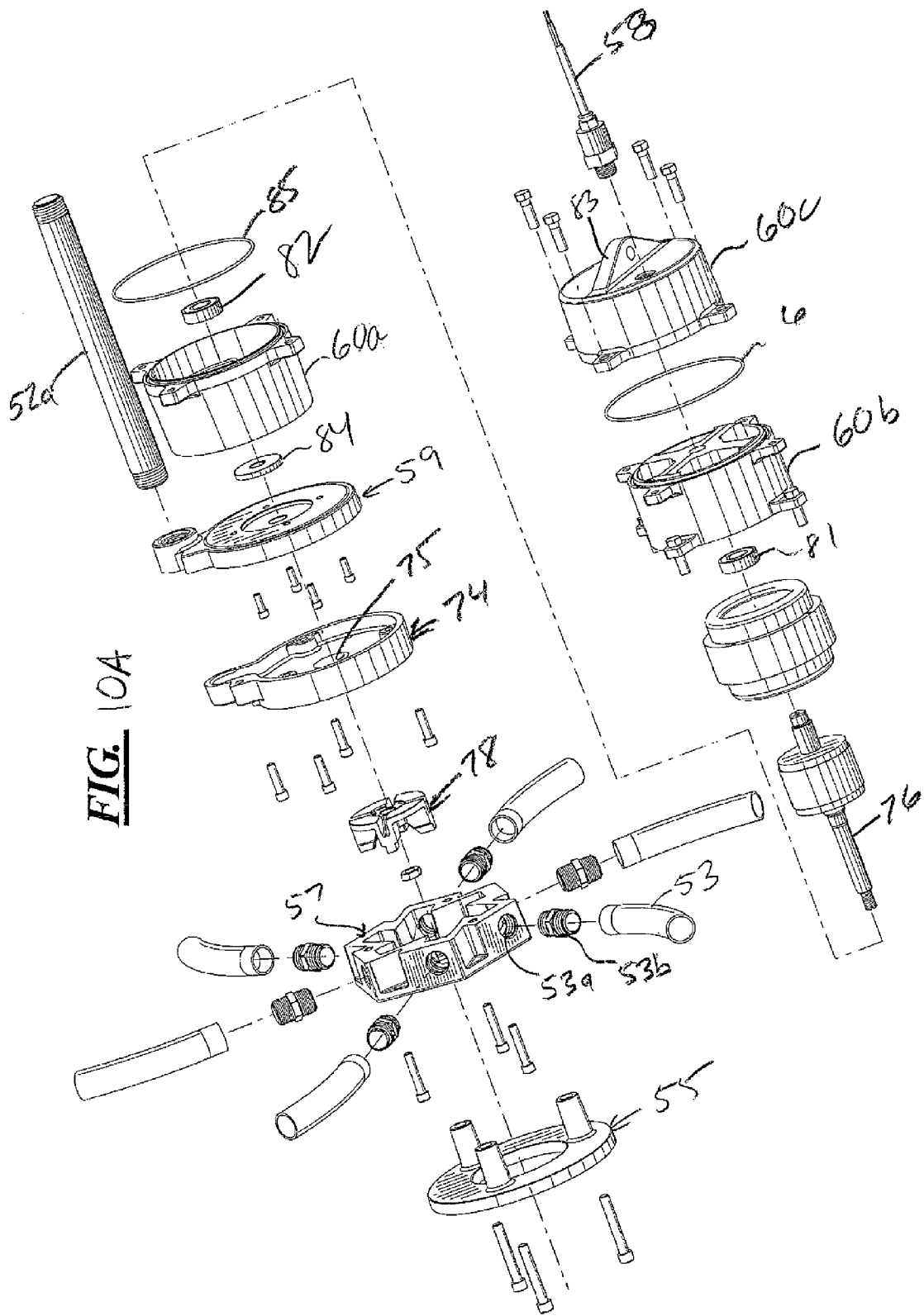
FIG. 10 is a sectional view of the aeration pump as shown in FIGS. 2-4 and 10A.

Turning to FIG. 4, in the air inlet line 52 may be connected to an extension pipe 52a which, in turn, connects to the pump 51 at the inlet plate 59 (see also FIG. 10A). The pump 51 includes a three-part housing including sections 60a-60c. As shown in FIG. 10 below, the section 60b may be removed for more compact configuration. The additional section 60b provides a space shown at 64 in FIG. 10 which can be used to house a capacitor for use in a permanent split capacitance motor. The impeller housing 57 is illustrated in greater detail below in connection with FIG. 9.

Figure 6:
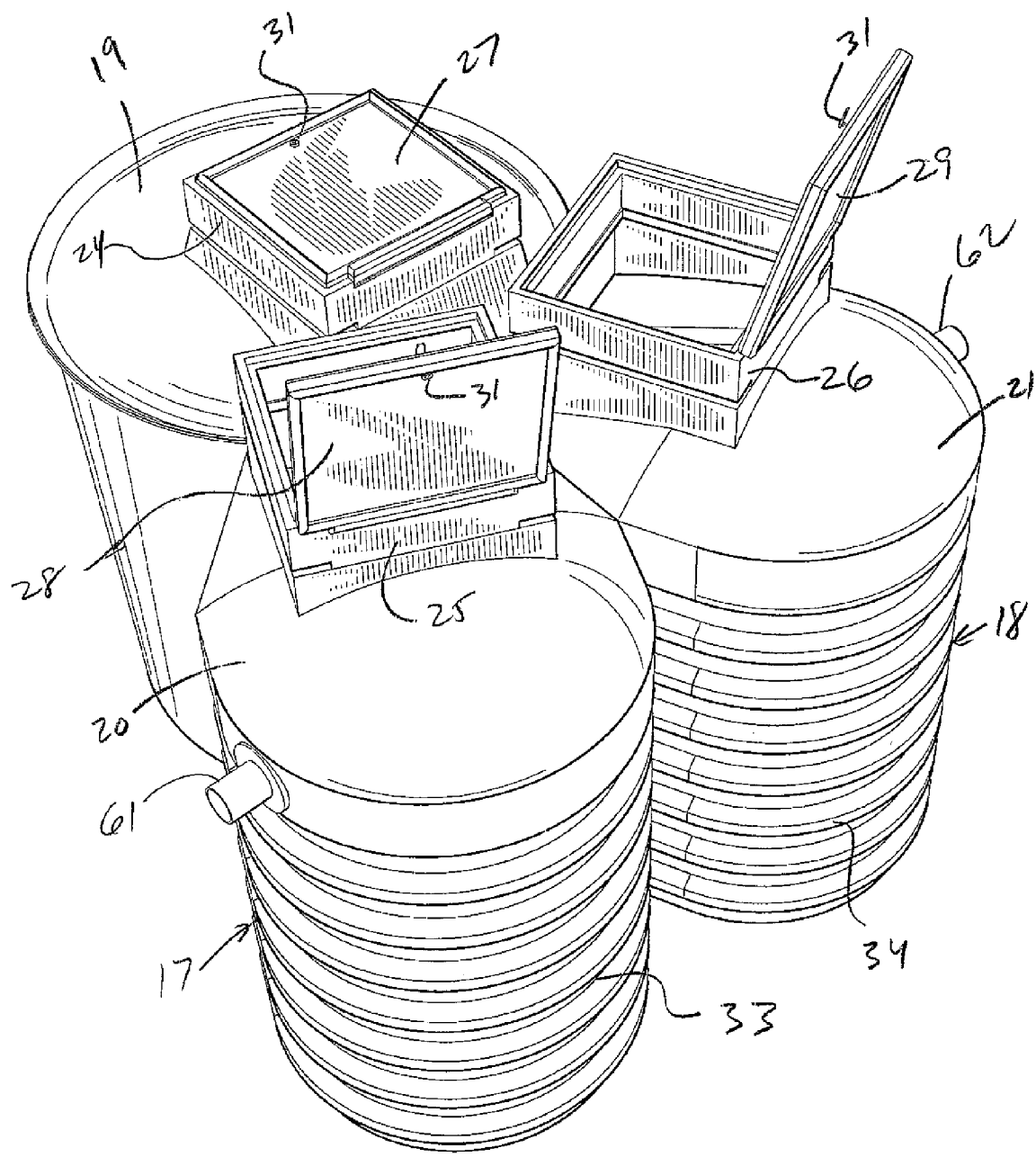
FIG. 6 is a another perspective view of the wastewater treatment system shown in FIG. 1, particularly illustrating the use of hinged lids and easy-to-use locks on the access hatches.

FIGS. 5-7 provide additional views of the tanks 16-18. In FIG. 5, the aerator tank 16 is shown in a sectional view with the hatch 24 disposed above the indented portion 47 of the clarifier 41. In FIG. 6, the orientation of the access hatches 24-26 and hinged lids 27-29 are shown. Further, the inlet 61 to the pretreatment tank 17 and the outlet 62 to the pump tank 18 are illustrated. FIG. 7 illustrates the general orientation of the access hatches 24-26 on the tanks 16-18.

Figure 8:
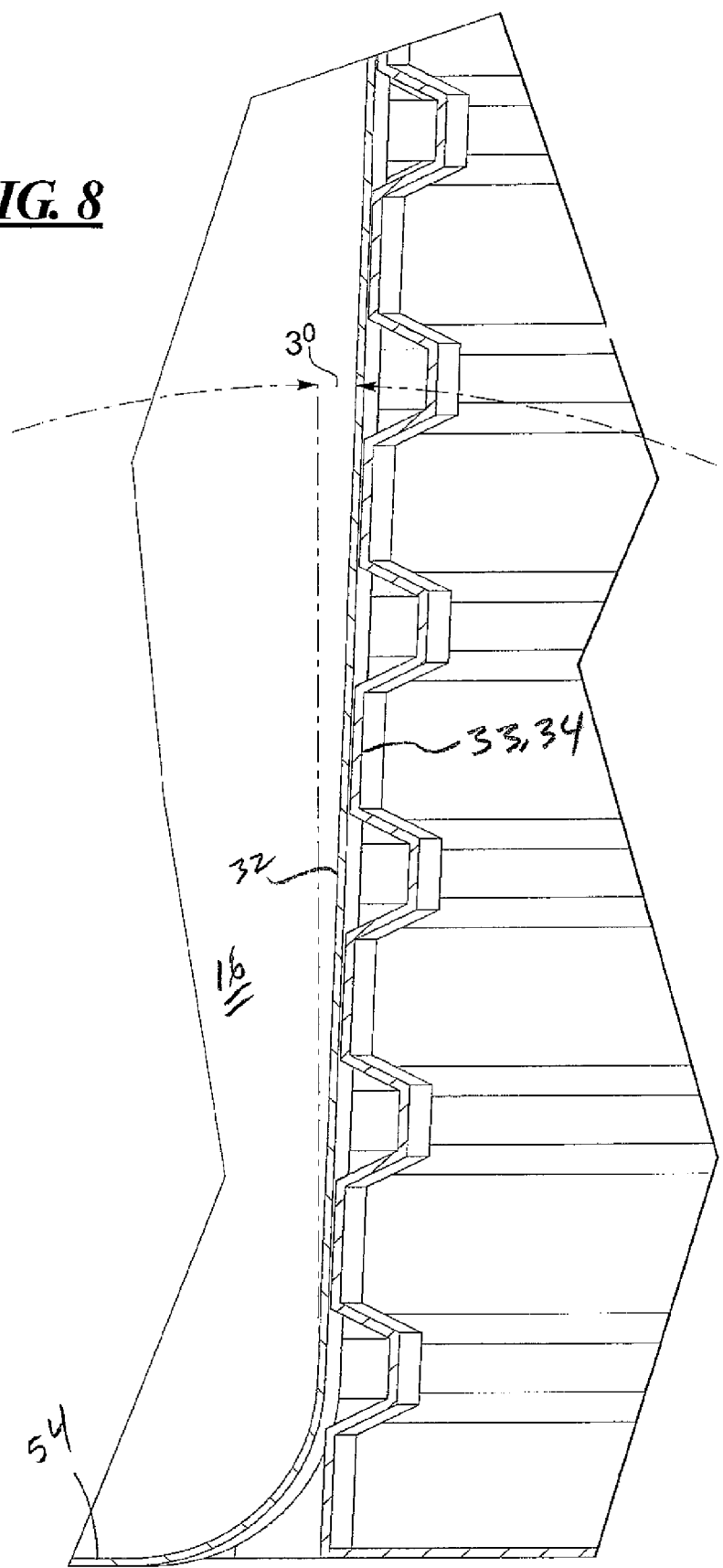
FIG. 8 is a partial sectional view of the aeration tank and either the pretreatment tank or pump tank, particularly illustrating the slope of the sidewalls of the tanks thereby enabling the pump and pretreatment tanks to nest against the sidewall of the aeration tank in a close-fitting relationship or abutting engagement as shown in FIG. 8.

In FIG. 8, the outward drift of the sidewall 32 of the aeration tank 16 as the sidewall 32 proceeds upward from the bottom 54 of the tank 16 is illustrated. In this example, the sidewall 32 is angled at about 3° with respect to vertical. Conversely, the cycles 33 or 34 of the pretreatment and pump tanks 17-18 are inclined by a negative like amount so that the close abutting relationship or nesting illustrated in FIG. 8 can be achieved.

The impeller housing 57 is illustrated in greater detail in FIG. 9. The housing or casing 57 may be fabricated from a single piece of metal. The opening 65 shown in the bottom of the casing 57 is a water inlet which is also shown in FIG. 10. The water inlet 65 is supported above the bottom 54 of the tank, 16 by the foot bracket 55 (FIG. 3). The space indicated generally at 66 in FIGS. 9-10 is a mixing chamber. The impeller housing 57 has a generally hexagonal geometry which facilitates the machining of the bubble outlets 53a as they are disposed in flat surfaces 53b. It will he noted that the ramped surfaces 67-71 that lead from the mixing chamber 66 to the outlet ports 53a improve the ability of the liquid/air media to pass from the mixing chamber 66 through the round bubble outlets 53a. The hexagonal geometry of the housing 57 also enhances the radial and tangential orientation of the bubble outlet lines 53 thereby contributing to the swirl mixing that takes place in the aeration space 48.

FIG. 10 illustrates the mixing of air and water in the pump 51. Air flows through the inlet 52 and fitting 52a through the inlet plate 59 and into the cavity 73 formed by the inlet plate 59 and air chamber plate 74. The air chamber plate 74 includes a bottom opening 75 through which the rotor 76 passes. The rotor 76 is connected to the impeller 78. The opening 75 is large enough for the passage of air as illustrated in FIG. 10 from the cavity 73 to the mixing chamber 66. Simultaneously, water proceeds up through the opening 65 in the impeller housing 57 into the mixing chamber where the action of the impeller 78 creates the air/water mixture that generates bubbles as the mixture is propelled out the bubble outlet ports 53a under the force of the impeller 78. Also illustrated in FIG. 10 is the stator 79 and bearing 81 which provides additional support thereby reducing friction, wear and heat generation resulting in prolonged motor life. The rotor 76 is also supported by the bearing 82 in the lower housing 60a. A bracket 83 accommodates the centralizing rod 56 as shown in FIG. 2.

Turning to FIG. 10A, the connection between the foot bracket 55 and the impeller housing 57 is illustrated. The bubble outlet ports 53a are preferably equipped with fittings 53b which, in turn, ate connected to relatively short pieces of flexible hosing 53 that serve as the bubble outlet lines. The impeller 78 is connected to the rotor 76 with a typical fastener. The air chamber 74 and inlet plate 59 are also connected with typical fasteners. A seal 84 prevents water from entering the motor housings 60a-60c. In addition to the seal 84, O-rings 85, 86 are also employed to waterproof the motor housing 60a-60c.

Figure 11:
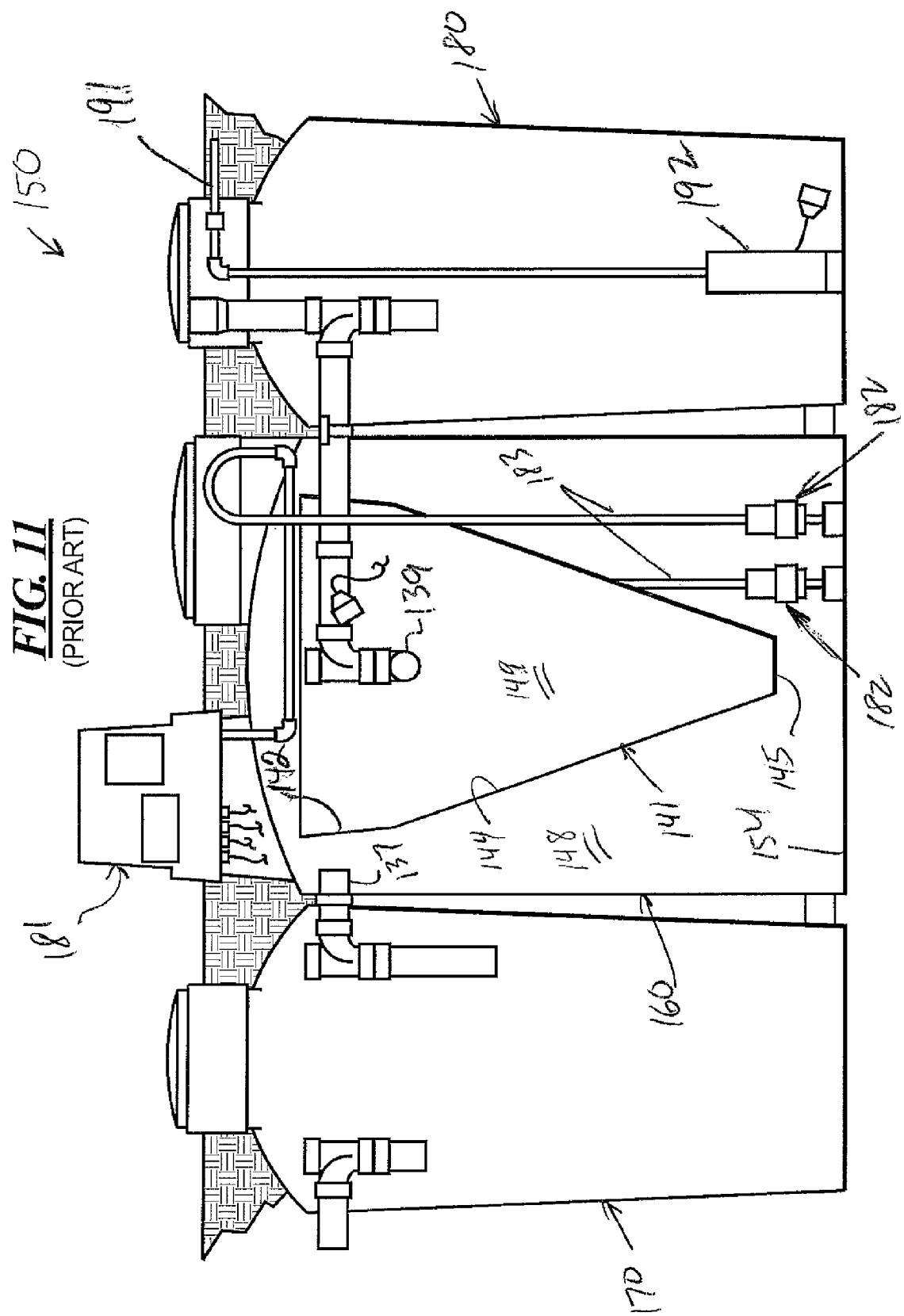
FIG. 11 is a plan view of a prior art wastewater treatment system that can be retrofitted using the teachings of this disclosure.

Turning to FIGS. 11-12, a method of retrofitting an existing system 150 with a pump 51 in accordance with the present disclosure is illustrated. Turning to FIG. 11, the existing system 150 includes an aeration tank 160, a pretreatment tank 170 and the pump tank 180. Compressor and control panels ate disposed in the housing 181 and the compressor is connected to the ceramic diffusers 182 by hoses 183. The clarifying cone is shown at 141. As noted above, the location of the diffusers 182 at the bottom of the tank is problematic as more than two diffusers 182 may be required in order to achieve proper mixing. Further, placing a compressor aboveground creates unwanted noise. To retrofit the system 150 with a submerged pump 51, a lower end of the clarifier 141 is removed and replaced with an insert shown at 142 which includes a frusto-conical section 143 and lower cylindrical section 144. The lower cylindrical section 144 has a diameter generally greater than the lower frustum 145 of the original clarifier 141 shown in FIG. 11. Thus, removing a lower portion of the clarifier 141 and creating a larger lower frustum shown at 146 in FIG. 12 enables the insert 142 to be used or, if the lower end of the original clarifier is close enough to the bottom 154 of the aeration tank 160, the insert 142 may not be necessary. In any event, before or after the clarifier 141 is modified, the original compressor, diffusers 182 and hoses 183 are removed and the pump 151 and air inlet 152 are lowered down the modified clarifier 141. The bubble outlet hoses 53 with their radial/tangential orientation will not only create fine bubbles, but also a swill motion in the aeration space 148 for improved mixing and bacterial activity. The outlet hoses 53 may be plastic (HDPE) hose pieces (1¼" OD; 1" ID). As a result, material being delivered to the pump tank 180 will be more clear and odor-free or practically odor-free.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A wastewater treatment system comprising:
    an aeration tank comprising an open top, a bottom and a sidewall extending therebetween;
    the open top of the aeration tank receiving a clarifier, the clarifier comprising a top received in the open top of the aeration tank, a lower frustum disposed above the bottom of the aeration tank, and a tapered sidewall extending between the top and lower frustum that defines an interior of the clarifier inside the tapered sidewall and an aeration space between the tapered sidewall and the sidewall of the aeration tank;
    an aerator pump disposed between the bottom of the aeration tank and the interior of the clarifier, the aerator pump being connected to an air inlet line and a plurality of bubble outlet lines;
    the plurality of bubble outlet lines being disposed below the frustum and above the bottom of the aeration tank and directed radially outward towards the sidewall of the aeration tank.

2. The system of claim 1, wherein the clarifier has an inverted frusto-conical shape the top of the clarifier being wider than the lower frustum of the clarifier.

3. The system of claim 2, wherein the lower frustum is connected to a downwardly extending cylinder that terminates above the bottom of the aeration tank,
    the plurality of bubble outlet lines being disposed below the cylinder directed outward beyond the cylinder.

4. The system of claim 1, wherein the air inlet line passes through the clarifier and frustum, and the aerator pump is centered along an axis of a downwardly extending cylinder.

5. The system of claim 1, wherein the open top of the aeration tank also receives a cover, the cover comprising an aerator access hatch,
    the tapered sidewall of the clarifier comprising an indented portion disposed below the aerator access hatch and in radial alignment with the inlet to the aeration tank,
    the aerator access hatch providing views of the aeration space and inlet through the indented portion and the interior of the clarifier.

6. The system of claim 5, wherein the aerator access hatch is covered by a hinged lid.

7. The system of claim 5, wherein the inlet to the aerator tank is in communication with a pretreatment tank, the outlet to the aerator tank is in communication with a pump tank, the pump and pretreatment tanks comprising baffled sidewalls that extend upward at a first deviation from vertical, the sidewall of the aerator tank extending upward from the bottom of the aerator tank at a second deviation from vertical that is opposite to and of a substantially similar magnitude as the first deviation, thereby enabling the non-vertical sidewalls of the aerator tank and pump tank to nest together in an abutting engagement and the sidewalls of the aerator tank and pretreatment tank to nest together in an abutting engagement.

8. The system of claim 7, wherein the pump and pretreatment tanks each include covers, the covers of the pump and pretreatment tanks each include pump and pretreatment access hatches respectively, each of which includes a hinged lid.

9. The system of claim 1, wherein the aerator pump comprises an impeller housing supported above the bottom of the aeration tank, the impeller housing comprising a plurality of tangentially directed outlets, each tangentially directed outlet being connected to one of the bubble outlets, the impeller housing further comprising a water inlet in communication with the aeration tank and an air inlet in communication with the air inlet line, the impeller housing further comprising a mixing chamber in communication with the water and air inlet, the mixing chamber housing an impeller.

10. The system of claim 9, wherein the impeller is mounted onto a rotor, the rotor passes through a stator, the stator being disposed within a sealed housing.

11. The system of claim 10, wherein the air inlet line and a power line extend from the aerator pump, through the clarifier and through the open top of the aeration tank.

12. A method of retrofitting an aeration tank of a wastewater treatment system wherein the aeration tank includes an open top, a closed bottom and a sidewall extending therebetween, the open top of the aeration tank receiving an inverted frusto-conical clarifier, the clarifier comprising a wide top received in the open top of the aeration tank, a narrow lower frustum disposed above the bottom of the aeration tank, and a tapered sidewall extending between the wide top and lower frustum that defines an interior of the clarifier inside the tapered sidewall and an aeration space between the tapered sidewall of the clarifier and the sidewall of the aeration tank, the aeration tank accommodating at least one diffuser disposed in the aeration space and connected to a compressor by at least on conduit, the compressor disposed outside of the aeration tank, the method comprising:
  removing the compressor, diffuser and conduit;
  providing a submersible aerator pump that is connected to an elongated air inlet line and a plurality of bubble outlet lines radially outward from the pump;
  placing the aerator pump downward through the clarifier and through the frustum of the clarifier and supporting the aerator pump and bubble outlet lines below the frustum so that the bubble outlet lines extend outwards towards the sidewall of the aeration tank and away from the frustum of the clarifier.

13. The method of claim 12 further comprising before the placing of the aerator pump,
  cutting the lower frustum off of the clarifier and removing the lower frustum to create a new frustum disposed vertically above a plane passing through the now-removed lower frustum,
  providing an insert comprising an inverted frusto-conical upper section connected to a lower cylindrical section,
  inserting the insert down through the clarifier so that the upper section rests on the new frustum of the clarifier and the lower cylindrical section extends downward through the new frustum and towards the bottom of the aeration tank, and
  wherein the placing of the aerator pump comprises placing the aerator pump downward through the lower cylindrical section of the insert so that the bubble outlet lines extend outwards towards the sidewall of the aeration tank and away from the lower cylindrical section of the insert.

14. The method of claim 12 wherein the aerator pump further comprises a foot bracket that supports the pump above the bottom of the aeration tank.

15. The method of claim 13, further comprising
  centering an upper portion of the aerator pump within the lower cylindrical section of the insert.

16. The method of claim 13, further comprising
  anchoring the upper portion of the aerator pump to the insert in a centralized position with respect to the lower cylindrical section of the insert and so that the bubble outlet lines extend tangentially outward from the aerator pump below the lower cylindrical section of the insert and towards the sidewall of the aeration tank.

17. The method of claim 12 wherein the aeration tank comprises an original cover that encloses the open top of the aeration tank, the method further comprising:
  replacing the original cover of the aeration tank with a replacement cover that comprises an access hatch equipped with a hinged lid.

18. The method of claim 12 further comprising removing the clarifier from the aeration tank and replacing the clarifier with a replacement clarifier comprising a wide top connected to a downwardly extending conically-shaped sidewall that terminates at a narrow lower frustum which is connected to a downwardly extending lower cylinder, and the method further comprises
  placing the aerator pump downward through the replacement clarifier and through the narrow lower frustum and lower cylinder of the clarifier and supporting the aerator pump and bubble outlet lines below the lower cylinder so that the bubble outlet lines extend outwards towards the sidewall of the aeration tank and away from the lower cylinder of the replacement clarifier.

* * * * *